US006778741B2

(12) United States Patent
Lefebvre

(10) Patent No.: US 6,778,741 B2
(45) Date of Patent: Aug. 17, 2004

(54) METHOD AND APPARATUS FOR ALIGNING A WAVEGUIDE WITH A RADIATION SOURCE

(75) Inventor: Paul Lefebvre, Laval (CA)

(73) Assignee: LXSIX Photonics Inc., St-Laurent (CA)

( * ) Notice: Subject to any disclaimer, the term of this patent is extended or adjusted under 35 U.S.C. 154(b) by 25 days.

(21) Appl. No.: 10/276,900

(22) PCT Filed: Jul. 26, 2002

(86) PCT No.: PCT/CA02/01182

§ 371 (c)(1),
(2), (4) Date: Jan. 16, 2003

(87) PCT Pub. No.: WO03/010572

PCT Pub. Date: Feb. 6, 2003

(65) Prior Publication Data

US 2003/0142915 A1 Jul. 31, 2003

(30) Foreign Application Priority Data

Jul. 26, 2001 (CA) ............................................ 2354289

(51) Int. Cl.[7] .............................................. G02B 6/26
(52) U.S. Cl. ............................ 385/52; 385/50; 385/97; 385/98
(58) Field of Search ......................... 385/50–52, 95–99

(56) References Cited

U.S. PATENT DOCUMENTS

| 4,506,947 A | * | 3/1985 | Tatekura et al. .............. 385/97 |
| 4,690,493 A | | 9/1987 | Khoe |
| 5,011,259 A | * | 4/1991 | Lieber et al. ................. 385/55 |
| H1426 H | | 4/1995 | Toeppen |
| 5,822,479 A | | 10/1998 | Napier et al. |
| 5,837,169 A | | 11/1998 | Rourke |
| 5,914,207 A | | 6/1999 | Nishiki et al. |
| 5,945,261 A | | 8/1999 | Rourke |
| 6,038,358 A | | 3/2000 | Nishiki |
| 6,183,918 B1 | | 2/2001 | Nishiki |

OTHER PUBLICATIONS

"Photoluminescence of Bragg gratings in germanoscilicate fibres excited at 488nm", Bucholtz et al, Electronics Letters, Jun. 6, 1996, vol. 32, No. 12, pp. 1130–1131.
XP 000632637 "Fabrication of High–Quality Long–Fiber Bragg Grating by Monitoring 3.1eV Radiation (400nm) from GeO Defects", Komukai et al, IEEE Photonics Technology Letters, vol. 8, No. 11, Nov. 1996, pp. 1495–1497.
XP 002228369 "Photochemical changes in hydrogen–loaded optical fibres with application to Bragg grating formation", Nguty et al., Meas. Sci. Technol. 8 (1997) 1055–1058.

* cited by examiner

Primary Examiner—Hemang Sanghavi
(74) Attorney, Agent, or Firm—Merchant & Gould, P.C.

(57) ABSTRACT

A method and apparatus for aligning an optical waveguide with a radiation source are provided. The waveguide has a longitudinal axis that defines a main optical propagation path. The optical waveguide is illuminated by the radiation source such that the waveguide generates light via photoluminescence, at least a portion of the light generated via photoluminescence being emitted from the waveguide along a direction generally transverse to the longitudinal axis. An output signal is generated at least in part on the basis of light emitted from the waveguide along a direction generally transverse to the longitudinal axis. The alignment of the radiation source and the waveguide is varied at least partly in dependence of the output signal.

25 Claims, 2 Drawing Sheets

METHOD AND APPARATUS FOR ALIGNING A WAVEGUIDE WITH A RADIATION SOURCE

FIELD OF THE INVENTION

This invention relates a method and an apparatus for aligning a waveguide with a radiation source, and more particularly, to a method an apparatus for aligning a waveguide with a radiation source using photoluminescence induced in the waveguide by the radiation source.

BACKGROUND

Many processes involving optical waveguides require a precise alignment between an optical waveguide and a radiation beam. For example, in Bragg grating writing by flood exposure, an ultraviolet (UV) laser light interference pattern is used to write the grating in a core of an optical fiber. The interference pattern, which is typically focussed, needs to be precisely aligned with the core. If the core receives light from a part of the interference pattern outside of the focus, the intensity of the interference pattern will not be maximal and an exposure time to the beam required to write a given Bragg grating will be increased with respect to the exposure time that would be required if the core was at the focus of the interference pattern. In addition, if no monitoring of the Bragg grating writing process can be performed during the writing phase, the absence of a well-controlled interference pattern intensity may lead to a Bragg grating into which index of refraction variations are not large enough to provide a required grating performance.

The photoluminescence of several materials used to manufacture optical fibers and other optical waveguides can be used to align the optical fiber with a laser beam in preparation for Bragg grating writing. Once the optical fiber is properly aligned, the laser beam is replaced by the interference pattern and the Bragg grating writing process can be performed.

Typically, an ultraviolet (UV) laser is held immobile and produces the laser beam. A supporting member supports the optical fiber, the longitudinal axis of the optical fiber being perpendicular to the longitudinal axis of the laser beam. The supporting member is mobile in a direction perpendicular to the longitudinal axis of the optical fiber and perpendicular to the longitudinal axis of the laser beam. The supporting member can be displaced either manually or with a motorized actuator.

When a portion of the laser beam illuminates the photoluminescent core of the optical fiber, the light produced by photoluminescence is propagated through the optical fiber to its extremities. A power meter located at one extremity of the fiber can then measure the intensity of the photoluminescence light, which depends on the power carried by the portion of the laser beam illuminating the core of the optical fiber. Accordingly, when the focus of the laser beam is centered on the core of the optical fiber, the intensity of the photoluminescence measured at the power meter is maximal. Therefore, to center the optical fiber on the laser beam, the supporting member is displaced to achieve a maximal value of the intensity of the photoluminescence detected at the extremity of the optical fiber.

The method described above requires that the power meter block one extremity of the optical fiber. In some instances, this is undesirable as it could be advantageous to have other equipment, such as Bragg grating writing monitoring equipment, connected to the extremities of the optical fiber.

Against this background, there exists a need to provide novel methods and devices for aligning a waveguide with a radiation source.

SUMMARY

In accordance with a broad aspect, the invention provides and apparatus for aligning an optical waveguide with a radiation source. The waveguide has a longitudinal axis that defines a main optical propagation path and the radiation source illuminates the waveguide such that the waveguide generates light via photoluminescence. At least a portion of the light generated via photoluminescence is emitted from the waveguide along a direction generally transverse to the longitudinal axis. The apparatus includes a sensor responsive to the light emitted from the waveguide along a direction generally transverse to the longitudinal axis for producing an output signal. Alignment means then vary the alignment of the radiation source and the waveguide at least partly in dependence of the output signal.

Advantageously, the invention allows aligning an optical waveguide with a radiation source, such as a laser, by using light generated through photoluminescence and emitted along a direction generally transverse to the longitudinal axis of the waveguide. By using photoluminescence emitted transversely to the longitudinal axis of the waveguide rather than detecting photoluminescence emitted at an extremity of the optical waveguide, the extremities of the optical waveguide remain free and can therefore by used for other useful purposes such as signal analysis.

In a specific example of implementation, the output signal generated by the sensor is an intensity signal indicative of an intensity of light. In a specific example of implementation, the alignment means includes a controller module responsive to the intensity signal for causing the alignment of the radiation source and the waveguide to be varied.

In a first non-limiting implementation, the controller module causes the waveguide to be displaced in order to cause the alignment of the radiation source and the waveguide to be varied.

In a second non-limiting implementation, the controller module causes the radiation source to be displaced in order to cause the alignment of the radiation source and the waveguide to be varied.

In a non-limiting implementation, the alignment means further comprise a light reflecting member positioned such as to redirect a radiation beam emitted by the radiation source. The reflecting member may be any suitable component adapted to reflect a radiation beam. A specific example of a light reflecting member is a mirror. In a specific non-limiting implementation, the light reflecting member is in the form of a mirror. The controller module is operative to cause the light reflecting member to be displaced in order to cause the alignment of the radiation source and the waveguide to be varied.

The controller module generates a control signal at least in part on the basis of the intensity signal. An actuator, responsive to the control signal generated by the controller module, displaces the light reflecting member such as to vary the alignment of the radiation source and the waveguide at least in part on the basis of the control signal. The displacing of the light reflecting member may be effected by means of rotation, by means of translation or by a combination of the translation and rotation of the light reflecting member.

In accordance with another broad aspect, the invention provides a method for aligning an optical waveguide with a radiation source, the waveguide having a longitudinal axis that defines a main optical propagation path. The method includes illuminating the waveguide such that the waveguide generates light via photoluminescence, at least a portion of the light generated via photoluminescence being emitted from the waveguide along a direction generally transverse to the longitudinal axis. An output signal is generated at least in part on the basis of light emitted from the waveguide along a direction generally transverse to the longitudinal axis. The alignment of the radiation source and the waveguide is then varied at least partly in dependence of the output signal.

In accordance with another broad aspect, the invention provides an apparatus for aligning an optical waveguide with a radiation source. The apparatus includes a waveguide support member, a sensor and a controller module. The waveguide support member is for holding an optical waveguide, the waveguide having a longitudinal axis that defines a main optical propagation path. The radiation source illuminates the waveguide such that the waveguide generates light via photoluminescence, at least a portion of the light generated via photoluminescence being emitted from the waveguide along a direction generally transverse to the longitudinal axis. The sensor is positioned in proximity to the optical waveguide and is responsive to the light emitted from the waveguide along a direction generally transverse to the longitudinal axis to produce an intensity signal indicative of a measure of the light detected. The controller module is responsive to the intensity signal for causing the alignment of the radiation source and the waveguide to be varied at least partly in dependence of the intensity signal.

In a first specific example of implementation, the waveguide support member is moveable and the controller module is responsive to the intensity signal for causing the waveguide support member to be displaced such as to cause the alignment of the radiation source and the waveguide to be varied.

In a first specific example of implementation, the controller module is responsive to the intensity signal for causing the direction of the radiation beam emitted by the radiation source to be altered such that the alignment of the radiation source and the waveguide to be varied.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

A detailed description of examples of implementation of the present invention is provided herein below with reference to the following drawings, in which.

Figure 1:
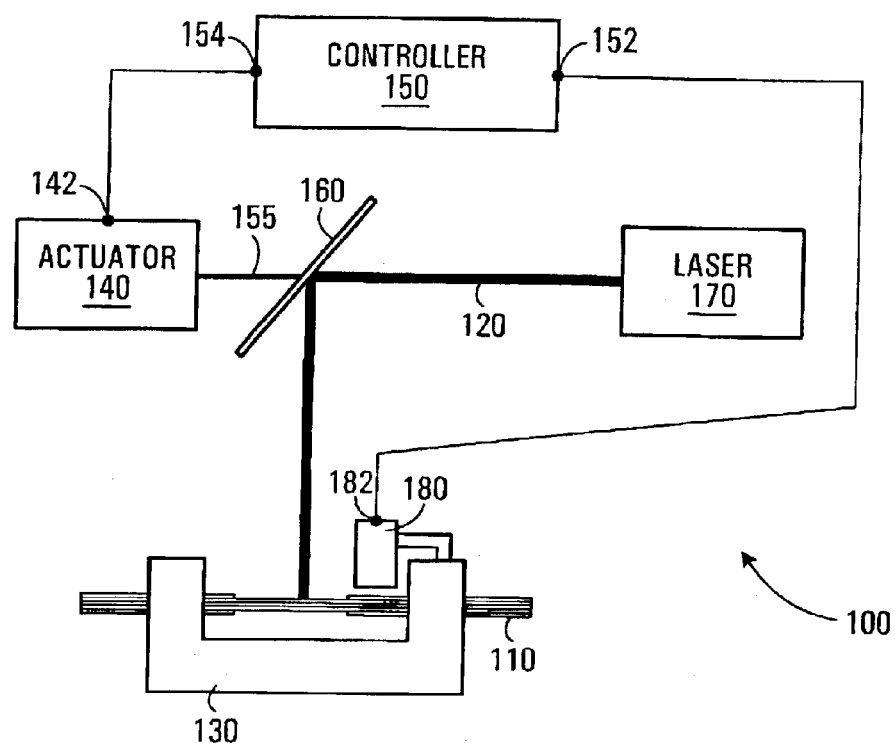
FIG. 1 shows an apparatus for aligning a laser beam with an optical fiber in accordance with a specific example of implementation of the invention.

In the drawings, embodiments of the invention are illustrated by way of example. It is to be expressly understood that the description and drawings are only for the purposes of illustration and as an aid to understanding, and are not intended to be a definition of the limits of the invention.

DESCRIPTION OF THE INVENTION

FIG. 1 shows an apparatus 100 for aligning an optical waveguide in the form of an optical fiber 110 with a radiation beam 120. While an optical fiber 110 is aligned with a radiation beam 120 in the apparatus 100, a similar apparatus could be used to align any other type of waveguide, such as optical fibers pre-assembled on a module or waveguides manufactured through integrated optics processes, with a radiation beam.

The apparatus 100 includes a waveguide support member in the form of a fiber support 130, an actuator 140, a controller 150, a mirror 160 mounted on an axle 155, a laser 170 and a sensor 180. In operation, the laser 170 emits the radiation beam 120 towards the mirror 160. The mirror 160 redirects the radiation beam 120 in the general direction of the optical fiber 110, which is held by the fiber support 130. During the alignment procedure, the actuator 140 rotates the mirror 160 through the axle 155 and under the control of the controller 150, thereby changing the direction of the radiation beam 120 reflected by the mirror 160.

When the mirror 160 is oriented such that the beam 120 illuminates the optical fiber 110, the optical fiber 110 emits photoluminescence in the form of visible light, which is propagated through the optical fiber 110. The sensor 180 then detects the visible light propagated in the optical fiber 110 at a location remote from the point at which the beam 120 intersects the optical fiber 110. As shown on FIG. 1, the sensor 180 detects visible light emitted radially from the optical fiber 110. The sensor 180 then produces an intensity signal related to an intensity of the light propagated by the optical fiber 110. The intensity signal is fed to the controller 150, which uses the intensity signal to control the actuator 140 in order to align the radiation beam 120 with the optical fiber 110.

Figure 2:
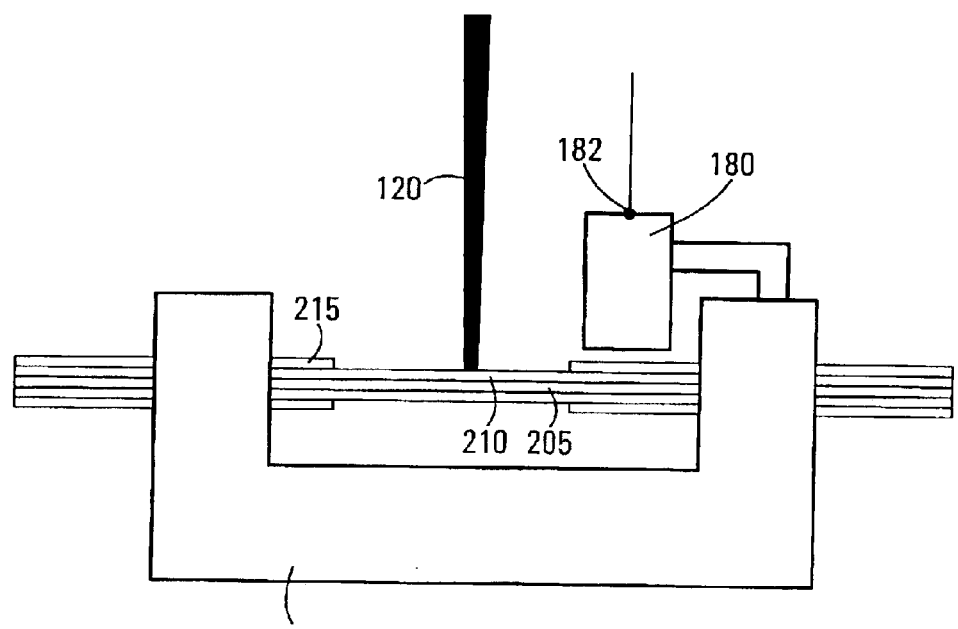
FIG. 2 shows an enlarged view of a portion of the apparatus of FIG. 1.

As shown on FIG. 2, the optical fiber 110 includes a core 205, a cladding 210 and, optionally, a coating 215. The core 205 includes a photoluminescent material. In the specific example of implementation presented on FIGS. 1 and 2, the core emits visible light when illuminated with UV radiation. However, the reader skilled in the art will readily appreciate that a core 205 having any other type of photoluminescence properties can be used without detracting from the spirit of the invention. Typically, the photoluminescence of the core 205 shows a reduction in intensity as a function of time when the UV radiation illuminates steadily the core 205. The cladding 210 is composed of a material having optical properties suitable for allowing the propagation of light in the core 205 through total internal reflection. The optional coating 215 protects the cladding 210. Such coatings 215 are well known in the art and will not be described in further details. In the specific example of implementation shown on FIGS. 1 and 2, the coating 215 is opaque to UV radiation and a portion of the coating 215 is removed from the optical fiber 110 prior to the alignment process. It will be appreciated that if an UV transparent coating 215 is used, removal of the portion of the coating 215 may be omitted.

Only a small portion of the optical fiber 110 is shown on FIGS. 1 and 2. The person skilled in the art will appreciate that the alignment of the optical fiber 110 with the radiation beam 120 can be performed as described herein irrespective of the total length of the optical fiber 110.

When the radiation beam 120 illuminates the core 205, photoluminescence is produced and the visible light thereby generated is propagated through the optical fiber 110. A portion of the visible light is emitted radially from the optical fiber 110 at a location remote from the point at which it is produced.

The fiber support 130 holds a portion of the optical fiber 110 which is to be aligned with the radiation beam 120. The exact shape and material of the fiber support 130 are not critical to the present invention. In a specific example of implementation, the fiber support 130 is immobile. In another specific example of implementation, the fiber support can be displaced manually to facilitate the access to the optical fiber 110. In a further specific example of implementation, the fiber support 130 is mounted on a mobile platform which allows a coarse alignment of the optical fiber 110 with the radiation beam 120.

The laser 170 produces the radiation beam 120. While a laser 170 producing an UV radiation beam 120 is used in the specific example of implementation shown on FIGS. 1 and 2, the reader skilled in the art will readily appreciate that any other suitable source of radiation could be used with the present invention as long as it has the capability to produce a radiation beam 120 that causes photoluminescence in the optical fiber 110. In a specific example of implementation, the laser 170 includes optical components for focussing and collimating the radiation beam 120.

The radiation beam 120 coming from the laser 170 is redirected in the general direction of the optical fiber 110 by the mirror 160. The mirror 160 is mounted on the axle 155 which allows the mirror 160 to rotate around the axis of the axle 155. In the specific example of implementation shown on FIG. 1, the radiation beam 120 exits the laser 170 in a direction generally parallel with the optical fiber 110. The mirror 160 is mounted at a 45 degrees angle with respect to the optical fiber 110. The axis of the axle 155 is also substantially parallel to the optical fiber 110. The mirror 160 is adapted to sweep the radiation beam 120 in a plane generally perpendicular to the optical fiber 110. The skilled person in the art will appreciate that the radiation beam 120 may exit the laser 170 in any suitable direction and does not need to be parallel with the optical fiber 110. In such a case, the mirror 160 is mounted at an angle that allows the mirror to sweep the radiation beam 120 originating from the laser 170 in a plane generally perpendicular to the optical fiber 110.

The actuator 140, which is controlled by the controller 150, rotates the mirror 160 around the axis of the axle 155. The method used by the controller 150 to control the rotation of the mirror 160 is described in further details below.

The rotation of the mirror 160 changes an amount of power carried by the radiation beam 120 to the core 205. Therefore, the photoluminescence produced in the core 205 varies in intensity. The sensor 180 measures the intensity of the photoluminescent visible light which exits the optical fiber 110 radially. The sensor 180 is located at a position remote from the location at which the radiation beam 120 induces the photoluminescence. In a specific example of implementation, the sensor 180 is located approximately 2 cm from the source of the photoluminescence and within 50 to 200 micrometers from the surface of the optical fiber 110. However, depending on the exact type of sensor 180 used in the apparatus 100, the sensor 180 could be located within a few millimeters of the source of the photoluminescence or a few kilometers away from the source of the photoluminescence without detracting from the spirit of the invention. Preferably, the sensor 180 is affixed to the apparatus 100 so that the position of the sensor 180 relatively to the optical fiber 110 does not vary while the alignment method is performed.

In a specific example of implementation, the coating 215 of the optical fiber is removed form the fiber at the location at which the sensor 180 is located. Alternatively, if the coating is transparent to the visible light emitted by photoluminescence, the sensor 180 can be located at location wherein the coating 215 is intact. In this alternative, the sensor can be in contact with the coating 215.

In a variant not shown in the drawings, the sensor 180 includes a multimode optical fiber connected to a remote power meter. The multimode optical fiber collects a portion of the photoluminescence visible light emitted radially from the optical fiber 110 and carries this portion of the visible light to the remote power meter, which generates a measurement of the intensity of the visible light.

The sensor 180 issues an intensity signal to the controller 150 through a sensor output 182. The intensity signal includes information regarding the intensity of the visible light received by the sensor 180. The controller 150 receives the intensity signal at a controller input 152 and is adapted to store corresponding intensity values in a memory.

In addition, the controller 150 is operative to issue control signals to an actuator input 142 of the actuator 140 through a controller output 154. The control signals instruct the actuator 140 to rotate the mirror 160 at a desired angle through the axle 155. In a specific example of implementation, the controller 150 is adapted to angle the mirror 160 at an angle that maximizes the power of the radiation beam 120 illuminating the core 205. As the reader skilled in the art will appreciate, other alignment criteria are possible without detracting form the spirit of the invention.

In a specific example of implementation, the alignment of the radiation beam 120 with the optical fiber 110 is performed in accordance with the following method. First, the optical fiber is coarsely aligned with the radiation beam while the mirror 160 is kept immobile. Then, the controller 150 sends control signals instructing the actuator 140 to rotate the mirror 160 in an oscillating manner while storing in the memory the intensity signals from the sensor 180. A value of an angle at which the mirror 160 is positioned is stored in the memory each time an intensity value is stored. After a predetermined number of oscillations, the controller 150 uses the intensity values and the mirror angle values stored in the memory to determine an optimal angle that the mirror 160 should assume so that the radiation beam 120 illuminates the optical fiber 110 in an optimal manner. As mentioned previously, in a specific example of implementation, the illumination is optimal when the intensity of the photoluminescence produced by the radiation beam 120 is maximal. If the radiation beam 120 is focussed, this corresponds to having the focal region of the radiation beam centered on the core 205.

Figure 3A:
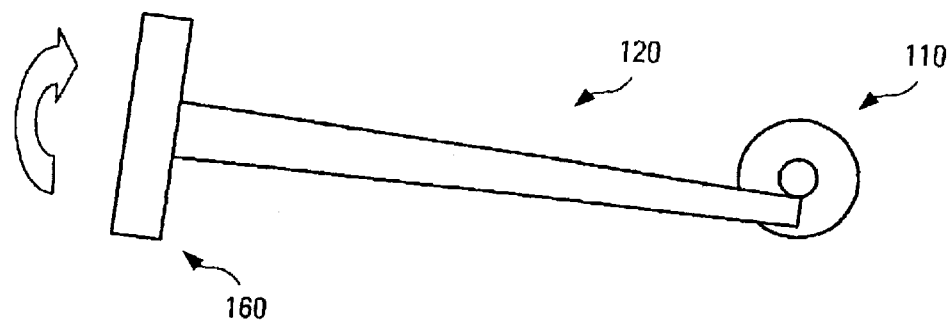
FIG. 3a shows a light reflecting member in the form of a mirror position to reflect a radiation beam in a first direction in accordance with a specific example of implementation of the invention.
Figure 3B:
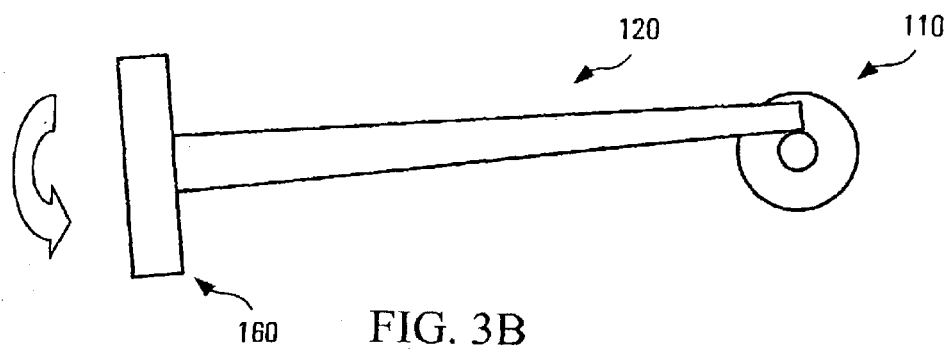
FIG. 3b shows a light reflecting member in the form of a mirror position to reflect a radiation beam in a second direction in accordance with a specific example of implementation of the invention.
Figure 3C:
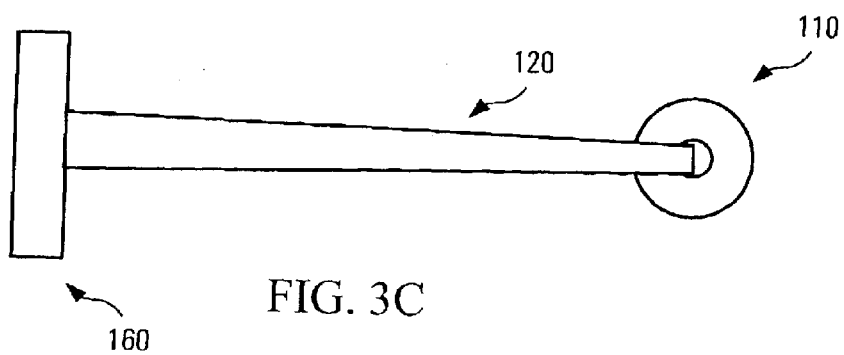
FIG. 3c shows a light reflecting member in the form of a mirror position to reflect a radiation beam in a third direction in accordance with a specific example of implementation of the invention.

For the purpose of illustration only, FIG. 3a shows a simplified diagram of the mirror 160 rotated to direct a radiation beam in a first direction such that the beam illuminates a first portion of the waveguide. FIG. 3b shows a simplified diagram of the mirror 160 rotated to direct a radiation beam in a second direction such that the beam illuminates a second portion of the waveguide. FIG. 3c shows a simplified diagram of the mirror 160 rotated to direct a radiation beam in a third direction such that the beam illuminates a third portion of the waveguide. In a non-limiting implementation, FIG. 3c shows the tilting mirror at an optimized position for alignment.

The coarse alignment of the optical fiber with the radiation beam is the first step performed. During this coarse alignment, the mirror 160 is kept immobile and the fiber support 130 is displaced. As mentioned previously, the coarse alignment is optional and can either be performed manually by an operator or automatically, for example using cameras and image processing software. The coarse alignment serves to locate the optical fiber 110 within a range of positions accessible by the radiation beam 120 under the rotation of the mirror 160.

After the coarse alignment is performed, the angle of the mirror around the axle 155 is changed in an oscillating manner by the actuator 140 under the control of the controller 150. This causes the radiation beam 120 to be swept from one side of the optical fiber to the other, In a specific example of implementation, the radiation beam 120 is swept at a frequency of approximately 5 to 50 Hz, but other suitable sweep frequencies can be used, depending on the exact type of fiber used without detracting from the spirit of the invention. The radiation beam 120 is swept continually in order to illuminate only briefly the core 205 at each sweep. This brief illumination is preferable because most currently available core materials present photoluminescence which reduces in intensity when the radiation causing the photoluminescence illuminates constantly a given portion of the core 205.

While the mirror 160 oscillates, the controller 150 stores in the memory intensity values for the photoluminescence conveyed by the intensity signal. The controller also stores in the memory a value of the angle at which the mirror 160 is positioned each time an intensity value is stored. In a first example of implementation, the value of the angle is determined by the controller 150 according to the control signals sent to the actuator 140. Therefore, in this example of implementation, there is an implicit assumption that the actuator 140 positions the mirror 160 at angle values contained in the control signals. Alternatively, the angle values can be measured independently and fed to the controller 150.

After a variable number of sweeps, which depends on the required precision in the alignment and on the uncertainties present in the stored angle values and intensity signal values, the controller 150 uses the angle values and the intensity signal values stored in the memory to find the optimal angle for the mirror 160. In a specific example of implementation, the optimal angle is an angle for which the measured intensity value is maximal. Methods to determine the optimal angle are well known in the art and will therefore not be described in further details. Finally, the mirror is angled at the optimal angle.

In a variant, the mirror is not rotatably mounted on the axle 155 but is instead translatably mounted on a suitable actuator. In this variant, the translation of the mirror sweeps the beam 120 back and forth across the optical fiber 110. Alternatively, the optical fiber 110 can be supported by a mobile fiber support 130. Then, the fiber support 130 is swept back and forth across an immobile laser beam. The reader skilled in the art will readily recognize other possible implementations that do not depart from the spirit of the invention.

In a further variant, the laser beam 120 is not swept rapidly enough across the optical fiber for the natural decay of the photoluminescence in time to be negligible. However, the decay of the photoluminescence in the core 205 can be modeled by the controller 205 to correct the stored intensity values by generating adapted intensity values, thereby allowing the optimal angle to be determined as described above. The adapted intensity values take into account a natural decay of photoluminescence in time.

While the alignment procedure described above has been presented in the context of an initial alignment prior to performing a process on the optical fiber 110, the reader skilled in the art will appreciate that the method could also be used periodically while the process is performed to maintain the alignment of the optical fiber 110 with the radiation beam 120.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. An apparatus for aligning an optical waveguide with a radiation source, the waveguide having a longitudinal axis that defines a main optical propagation path, the radiation source illuminating the waveguide such that the waveguide generates light via photoluminescence, at least a portion of the light generated via photoluminescence being emitted from the waveguide along a direction generally transverse to the longitudinal axis, said apparatus comprising:
   a) a sensor responsive to the light emitted from the waveguide along a direction generally transverse to the longitudinal axis for producing an output signal;
   b) alignment means to vary the alignment of the radiation source and the waveguide at least partly in dependence of the output signal.

2. An apparatus as defined in claim 1, wherein said output signal is an intensity signal indicative of an intensity of light.

3. An apparatus as defined in claim 2, wherein said alignment means includes a controller module responsive to the intensity signal for causing the alignment of the radiation source and the waveguide to be varied.

4. An apparatus as defined in claim 3, where said controller module causes the radiation source to be displaced in order to cause the alignment of the radiation source and the waveguide to be varied.

5. An apparatus as defined in claim 3, where said controller module causes the waveguide to be displaced in order to cause the alignment of the radiation source and the waveguide to be varied.

6. An apparatus as defined in claim 4, where said alignment means further comprise a light reflecting member positioned such as to redirect a radiation beam emitted by the radiation source, said controller module being operative to cause said light reflecting member to be displaced in order to cause the alignment of the radiation source and the waveguide to be varied.

7. An apparatus as defined in claim 6, wherein said light reflecting member is displaced by translation.

8. An apparatus as defined in claim 6, wherein said light reflecting member is displaced by rotation.

9. An apparatus as defined in claim 6, wherein said light reflecting member includes a mirror.

10. An apparatus as defined in claim 6, wherein said controller module generates a control signal at least in part on the basis of the intensity signal, said alignment means further including a actuator operatively coupled to said light reflecting member, said actuator being responsive to the control signal generated by said controller module for displacing said light reflecting member such as to vary the alignment of the radiation source and the waveguide at least in part on the basis of the control signal.

11. An apparatus as defined in claim 10, wherein displacing said light reflecting member includes a rotation of the light reflecting member.

12. An apparatus as defined in claim 10, wherein displacing said light reflecting member includes a translation of the light reflecting member.

13. A method for aligning an optical waveguide with a radiation source, the waveguide having a longitudinal axis that defines a main optical propagation path, said method comprising:
   a) illuminating the waveguide such that the waveguide generates light via photoluminescence, at least a portion of the light generated via photoluminescence being emitted from the waveguide along a direction generally transverse to the longitudinal axis;
   b) generating an output signal at least in part on the basis of light emitted from the waveguide along a direction generally transverse to the longitudinal axis;
   c) varying the alignment of the radiation source and the waveguide at least partly in dependence of the output signal.

14. A method as defined in claim 13, wherein said output signal is an intensity signal indicative of an intensity of light.

15. A method as defined in claim 14, comprising displacing the radiation source in order to cause the alignment of the radiation source and the waveguide to be varied.

16. A method as defined in claim 14, comprising displacing the waveguide in order to cause the alignment of the radiation source and the waveguide to be varied.

17. An apparatus suitable for aligning an optical waveguide with a radiation source, said apparatus comprising:
   a) a waveguide support member suitable for holding an optical waveguide, the waveguide having a longitudinal axis that defines a main optical propagation path, the radiation source illuminating the waveguide such that the waveguide generates light via photoluminescence, at least a portion of the light generated via photoluminescence being emitted from the waveguide along a direction generally transverse to the longitudinal axis;
   b) a sensor for positioning in proximity to the optical waveguide, said sensor being responsive to the light emitted from the waveguide along a direction generally transverse to the longitudinal axis to produce an intensity signal indicative of a measure of the light detected;
   c) a controller module responsive to the intensity signal for causing the alignment of the radiation source and the waveguide to be varied at least partly in dependence of the intensity signal.

18. An apparatus as defined in claim 17, where said waveguide support member is moveable and the controller module is responsive to the intensity signal for causing the waveguide support member to be displaced such as to cause the alignment of the radiation source and the waveguide to be varied.

19. An apparatus as defined in claim 17, where said controller module is responsive to the intensity signal for causing the direction of the radiation beam emitted by the radiation source to be altered such that the alignment of the radiation source and the waveguide to be varied.

20. An apparatus as defined in claim 17, wherein said sensor is mounted on said waveguide support member.

21. An apparatus as defined in claim 17, wherein the light detected by said sensor includes visible light.

22. An apparatus as defined in claim 19, wherein said controller is adapted to:
   a) process the intensity signal to generate an adapted intensity signal, the adapted intensity signal taking into account a natural decay of photoluminescence in time;
   b) cause the alignment of the radiation source and the waveguide to be varied at least in part on the basis of the adapted intensity signal.

23. An apparatus as defined in claim 17, where said optical waveguide is an optical fiber.

24. An apparatus as defined in claim 17, where said optical waveguide is selected from the set consisting of optical fibers pre-assembled on a module or waveguides manufactured through integrated optics processes.

25. An apparatus suitable for aligning an optical waveguide with a radiation source, said apparatus comprising:
   a) support means for holding an optical waveguide, the waveguide having a longitudinal axis that defines a main optical propagation path, the radiation source illuminating the waveguide such that the waveguide generates light via photoluminescence, at least a portion of the light generated via photoluminescence being emitted from the waveguide along a direction generally transverse to the longitudinal axis;
   b) sensor means responsive to the light emitted from the waveguide along a direction generally transverse to the longitudinal axis to produce an intensity signal indicative of a measure of the light detected;
   c) control means responsive to the intensity signal for causing the alignment of the radiation source and the waveguide to be varied at least partly in dependence of the intensity signal.

* * * * *